United States Patent [19]

Takemoto et al.

[11] 4,247,686

[45] Jan. 27, 1981

[54] PROCESS FOR REMOVING VCM FROM POLYVINYL CHLORIDE

[75] Inventors: Yutaka Takemoto, Chiba; Syozo Senguro; Masayoshi Nitta, both of Ichihara, all of Japan

[73] Assignee: Sumitomo Chemical Company, Limited, Osaka, Japan

[21] Appl. No.: 897,156

[22] Filed: Apr. 17, 1978

Related U.S. Application Data

[63] Continuation of Ser. No. 683,801, May 6, 1976, abandoned.

[30] Foreign Application Priority Data

May 4, 1975 [JP] Japan ................. 50-58074

[51] Int. Cl.³ ............................................. C08F 6/24
[52] U.S. Cl. .............................. 528/501; 526/344.2; 528/502; 528/503
[58] Field of Search ............... 528/480, 499, 501, 502, 528/503

[56] References Cited

U.S. PATENT DOCUMENTS

| | | | |
|---|---|---|---|
| 2,349,412 | 5/1944 | Douglas | 528/502 X |
| 2,514,207 | 7/1950 | Johnson | 203/73 |
| 3,317,449 | 5/1967 | Isaacs | 526/225 |
| 3,475,398 | 10/1969 | Jobard | 526/63 X |
| 3,547,865 | 12/1970 | Hoch | 528/502 X |
| 3,563,975 | 2/1971 | Zavasnik | 528/502 X |

FOREIGN PATENT DOCUMENTS

| | | | |
|---|---|---|---|
| 1248943 | 8/1967 | Fed. Rep. of Germany | 526/344 |
| 2331895 | 1/1974 | Fed. Rep. of Germany | 526/344 |

*Primary Examiner*—C. A. Henderson, Jr.
*Attorney, Agent, or Firm*—Wenderoth, Lind & Ponack

[57] ABSTRACT

A process is provided for reducing the concentration of vinyl chloride monomer in a polymerized slurry obtained by the suspension-polymerization of vinyl chloride alone or a mixture of vinyl chloride with a monomer copolymerizable therewith, the improvement characterized in that a polymerized slurry at a temperature between 40° C. and 100° C. is jetted and/or flowed down into the gas phase portion of a vessel maintained at a pressure below atmospheric pressure.

13 Claims, 1 Drawing Figure

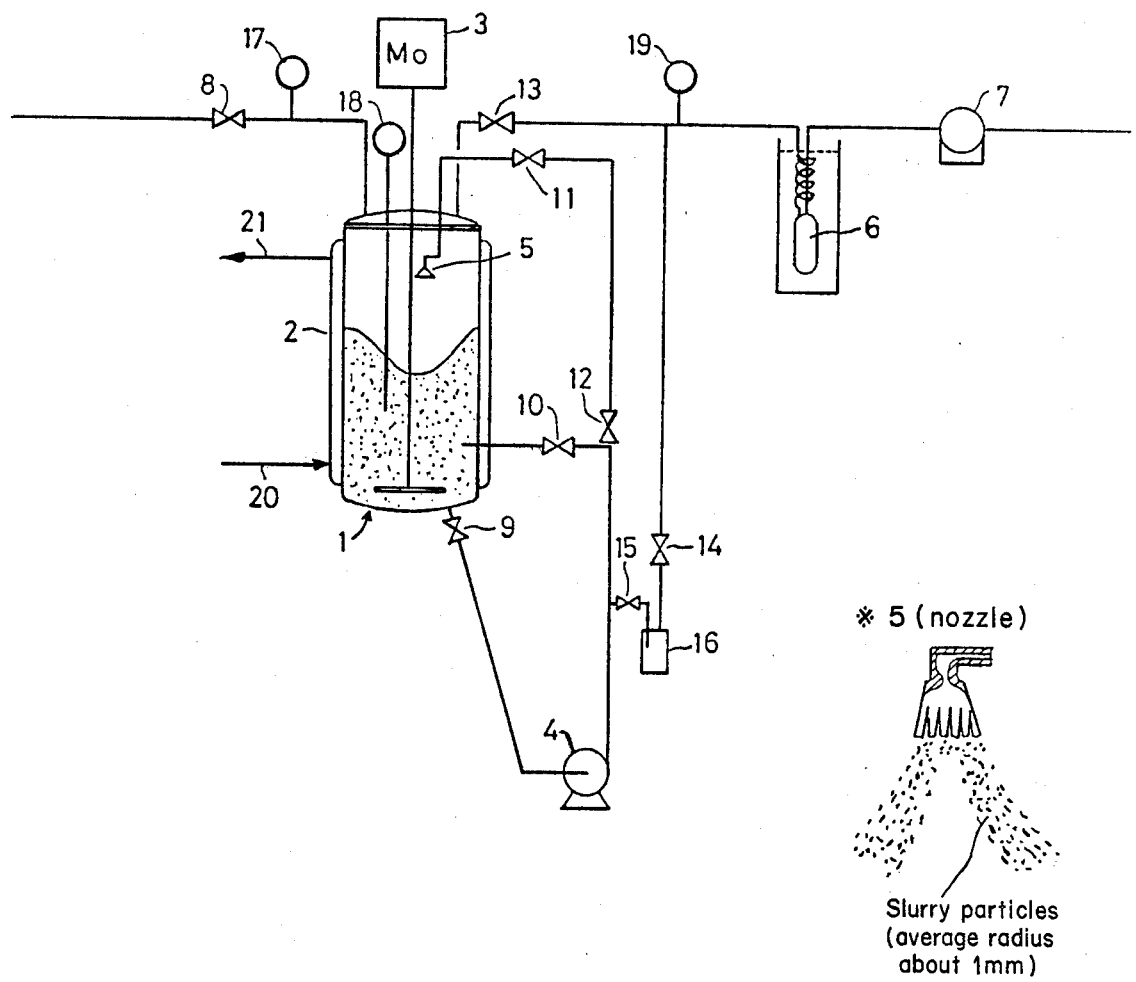
*5 (nozzle)
Slurry particles (average radius about 1mm)

PROCESS FOR REMOVING VCM FROM POLYVINYL CHLORIDE

This is a continuation of application Ser. No. 683,801, filed May 6, 1976, now abandoned.

The present invention relates to a process for reducing the content of vinyl chloride monomer remaining in polyvinyl chloride resin. More particularly, the invention relates to a process wherein a polymerized slurry, after the polymerization of vinyl chloride monomer, is jetted and/or flowed down into the gas phase portion of a vessel (which may be the polymerization vessel or another vessel), whereby the vinyl monomer concentration in the polymerized slurry is markedly reduced.

Vinyl chloride monomer is harmful to the human body and thus the pollution of the work environment due to leakage of vinyl chloride monomer into the air presents a serious problem for workers involved in polyvinyl chloride resin production and processing.

The improvement of the work environment in the polyvinyl chloride resin processing industry will not be fundamentally attained without reducing the monomer content in the resin. For this purpose, it is necessary to reduce the vinyl chloride monomer content at the time of production, namely in any of the steps of polymerization, dehydration and drying, and at present, this reduction is being earnestly studied.

Upon obtaining polyvinyl chloride resin in an industrial method by suspension polymerization of vinyl chloride monomer, 70 to 95% of the vinyl chloride monomer supplied to the polymerization vessel forms a polymer and the remaining 5 to 30% is recovered from the polymerization vessel and is reused, if necessary, after purification.

A conventional process widely employed for recovering the vinyl chloride monomer remaining in polyvinyl chloride resin comprises stirring in a vessel a polymerized slurry obtained by the suspension polymerization of vinyl chloride monomer, and recovering a major portion of unreacted monomer remaining in the polymerized slurry until the pressure in the vessel reaches atmospheric pressure. Reduction of vinyl chloride monomer remaining in the polymerized slurry is insufficient by relying only on a recovery operation of this type. Therefore, another method has been carried out which comprises stripping, under reduced pressure, an unreacted portion of vinyl chloride monomer remaining in the polymerized slurry, while the slurry in the vessel is being stirred and heated.

When an unreacted portion of vinyl chloride monomer remaining in the slurry is recovered by stripping the polymerized slurry under reduced pressure, it is known that the degree of pressure reduction in the vessel of the polymerized slurry should be preferably increased as possible, and that the higher the temperature at that time, the more the unreacted monomer recovered. However, even though the unreacted monomer is recovered at a high temperature and for a long time at the risk of the deterioration in the quality of the resin in order to reduce the content of the monomer in the polymerized slurry to a minimum, the content attained is at most 1000–5000 μg vinyl chloride monomer/g polyvinyl chloride (hereinafter abbreviated simply as ppm), and it is nearly impossible to obtain a lower content of the monomer. Namely, because the deterioration in quality is caused by exposing polyvinyl chloride resin to an elevated temperature for a long time, it has been considered nearly impossible to reduce the amount of vinyl chloride monomer from the polymerized slurry during the polymerization step.

SUMMARY OF INVENTION

As a result of our study to prevent vinyl chloride monomer pollution of the social and labor environment by recovering unreacted vinyl chloride monomer remaining in the polymerized slurry of polyvinyl chloride resin, we reached the present invention.

The object of the present invention is to recover vinyl chloride monomer remaining in the polymerized slurry to an extent which has been considered utterly impossible to reach, in an easy way and in a short time, without causing any deterioration in the qualities of the polyvinyl chloride resin, especially thermal stability.

The present invention is a process for reducing the concentration of unreacted vinyl chloride monomer remaining in the polymerized slurry obtained by the suspension polymerization of vinyl chloride alone or a mixture of vinyl chloride with a monomer copolymerizable therewith, wherein the polymerized slurry at 40° to 100° C. is jetted and/or flowed down into the gas phase portion maintained at a pressure below atmospheric pressure.

BRIEF DESCRIPTION OF DRAWING

The drawing illustrates an apparatus which can be used in carrying out the process of the present invention.

DETAILED DESCRIPTION OF INVENTION

In the drawing, the reference numerals represent the following parts:
1—autoclave
2—jacket
3—adjustable stirring motor
4—slurry circulation pump
5—slurry jetting nozzle
6—cooling trap for evaporated water and counter
7—vacuum pump
8-15—valves
16—slurry sampling tube
17—pressure detector
18—thermo-detector
19—pressure detector
20—inlet for temperature controlling medium
21—outlet for temperature controlling medium Using autoclave 1, all of valves 8–15 being closed, VCM (vinyl chloride monomer) is polymerized. After completion of polymerization, hot water is introduced into jacket 2 thereby starting heating of the slurry, and valve 8 is opened to purge off unreacted VCM. When the inner pressure reaches about atmospheric pressure, valve 8 is closed, valve 13 is opened and vacuum pump 7 is started working to reduce the pressure in the system. Valves 9, 11 and 12 are then opened and the slurry is jetted into the gas phase of autoclave 1 through nozzle 5 by means of pump 4. Valve 14 is then opened to equalize the pressure in slurry sampling tube 16 and the pressure in autoclave 1. Thereafter, valve 14 is closed and valve 15 is opened to take a sample of the slurry into sampling tube 16. After closing valve 15, the sample slurry is taken out and analyzed.

The present invention is applicable to the recovery of the vinyl chloride monomer after the suspension polymerization of vinyl chloride. More concretely, after the suspension polymerization in a continuous or batchwise operation, the pressure in the polymerization vessel is reduced to atmospheric pressure to recover a part, e.g. a major part, of unreacted monomer by the pressure release, and the slurry in suspension form is withdrawn continuously or intermittently through a pipe from an appropriate position of the polymerization vessel, for example from the bottom or the side, and the slurry is jetted and/or flowed down into the gas phase portion by a pump.

In place of using the polymerization vessel, another vessel specially prepared for the recovery of vinyl chloride monomer may be used. Also, in place of using a single vessel two or more vessels may be used in combination.

Therefore, the gas phase portion may be the gas phase portion of the polymerization vessel or may be the gas phase portion of another vessel.

Whereas by conventional processes it has been possible to reduce the vinyl chloride monomer content only to 1000–5000 ppm even at the risk of deterioration in the quality of the resin, it is surprisingly possible by the present invention to reduce the monomer content to below 500 ppm, or depending on conditions, to below 10 ppm, or to below 1 ppm in case of appropriate conditions, in an easy way and in a short time, without any risk of deterioration in quality of the resin.

The monomers copolymerizable with vinyl chloride as referred to herein include vinyl acetate, ethylene, propylene and vinyl ether as representative compounds, the content of such monomer(s) in the copolymer being up to 30% by weight.

The methods, as referred to in the present invention, of jetting or flowing down the polymerized slurry into the gas phase portion include the following methods:

(1) A method wherein a polymerized slurry obtained by polymerizing vinyl chloride alone or a mixture of vinyl chloride with a monomer copolymerizable therewith (hereinafter referred to simply as the slurry) is continuously withdrawn from the vessel in which the slurry is present and is jetted as fine droplets into the gas phase portion of the slurry vessel.

(2) A method wherein the slurry is continuously withdrawn from the vessel in which the slurry is present and is jetted as fine streams into the gas phase portion of the slurry vessel.

(3) A method wherein the slurry is continuously withdrawn from the vessel in which the slurry is present and is jetted as fine droplets through the gas phase portion of the slurry vessel against the wall which is in contact with the gas phase portion, so as to cause the slurry to flow down on the wall.

(4) A method wherein the slurry is continuously withdrawn from the vessel in which the slurry is present and is jetted as fine streams through the gas phase portion of the slurry vessel against the wall which is in contact with the gas phase portion, so as to cause the slurry to flow down on the wall.

(5) A method wherein two or more methods of (1) to (4) are combined or a method wherein all methods are combined.

In each of the above mentioned methods, it is desirable that the polymerized slurry should be jetted and/or flowed down into the gas phase portion while the slurry is being circulated. In this case, the amount of circulation of the slurry is so fixed that it is circulated at least once on the average during its recovery time, or the recovery time may be fixed to such a time that at least the whole content in the vessel is circulated at least once. The circulation amount and the recovery time are suitably chosen, and of course a shorter recovery time is better. For this purpose, it is necessary to increase the amount of circulation. With too large an amount of circulation, however, the recovery time is not shortened in proportion to an increase in power costs. These are also dependent on the form of the jet and/or flow of the slurry, and the slurry is desirably dispersed into the gas phase portion as fine as possible. Especially, an atomized slurry gives good results. Also, equipment with one or more baffle boards is desirable because such boards increase contact time and contact area of the slurry with the gas phase.

A high temperature of the slurry in the slurry vessel is desirable for the reduction of the content of remaining vinyl chloride monomer, but at a high temperature, deterioration of polyvinyl chloride resin is a problem. On the other hand, it is not necessary to cool the slurry to a temperature below the polymerization temperature. Accordingly, to reduce the content of remaining vinyl chloride monomer and to recover it effectively, a temperature in the range of from 40° to 100° C. is preferable, and more preferably from 50° to 90° C.

The pressure in the slurry vessel is desirably as low as possible. Examples of the pressure are pressures higher than 55.4 or higher than 92.5 mmHg abs. It is desirable that the pressure should be maintained below a pressure which is equal to the vapor pressure of water having a temperature 10° C. higher than the temperature of the slurry, or preferably below a pressure equal to the vapor pressure of water having a temperature 2° C. higher than said temperature.

While the present invention is explained in further detail by way of examples hereunder, it is to be understood that the invention is not limited by these examples so far as one does not depart from the spirit and meaning of the invention.

The "blank" in each table showing the concentration of vinyl chloride monomer remaining in the polyvinyl chloride resin obtained by each example means a polyvinyl chloride resin obtained by the same operations as in the example except for excluding the operation of jetting and/or flowing the polymerized slurry into the phase portion.

EXAMPLE 1

Vinyl chloride was suspension-polymerized in water, using polyvinyl alcohol as the suspending agent and diisopropyl peroxydicarbonate as the polymerization initiator, to obtain about 1.5 kg of a polymerized slurry having a weight ratio of polyvinyl chloride to water of 1:2. (In the following examples, a slurry obtained in the same way by suspension polymerization will be used.)

Subsequently, unreacted monomer remaining in the autoclave, about 2 liters in capacity, used for polymerization, was released until the pressure in the autoclave reached atmospheric pressure. Thereafter, the slurry in the autoclave was continuously withdrawn by a pump from the bottom of the autoclave at the rate of 1.5 liters per minute, under stirring at 120 rpm, with the temperature of the slurry in the autoclave and the pressure in the autoclave maintained at 85° C. and 435 mmHg abs., respectively. The withdrawn slurry was then jetted into the gas phase portion of the autoclave in the form of fine droplets so that the average radius of the droplets was about 1 mm. and thus the recovery of vinyl chloride monomer was performed for 60 minutes, while a part of the slurry was sampled successively to see how the concentration of vinyl chloride monomer in the slurry was reduced. The slurry sample obtained after the recovery operation and the samples collected in the course of from the beginning to the end of the recovery operation were analyzed by gas chromatography for the amount of remaining vinyl chloride monomer, which was obtained as the amount contained in the unit weight of the slurry used for analysis. The results are shown in Table 1, each amount being given in terms of the amount of vinyl chloride monomer per unit weight of the polyvinyl chloride contained in the slurry sample.

TABLE 1

| Recovery time (min.) | Number of average circulation times of slurry | Vinyl chloride monomer concentration in polyvinyl chloride (ppm) | |
|---|---|---|---|
| | | Invention | Blank |
| 0 | 0 | 11,300 | 12,140 |
| 10 | 10 | 170 | 8,030 |
| 20 | 20 | 23 | 5,510 |
| 30 | 30 | 5 | 2,000 |
| 45 | 45 | 1 | 1,430 |
| 60 | 60 | <1 | 1,020 |

As apparent from Table 1, the vinyl chloride monomer concentrations in the polyvinyl chloride obtained by recovering vinyl chloride monomer in the polymerized slurry by the process of the present invention are markedly reduced in comparison with those of the blank. When vinyl chloride monomer in the polymerized slurry is recovered under the conditions of this example, it is understood that, to attain a vinyl chloride monomer concentration in the obtained polyvinyl chloride of less than 200 ppm a treating time of 10 minutes is sufficient, and for less than 1 ppm, 60 minutes is sufficient.

EXAMPLE 2

A polymerized slurry was obtained in the same way as in Example 1. Then, unreacted vinyl chloride monomer remaining in the autoclave, about 2 liters in capacity, used for polymerization, was released until the pressure in the autoclave reached atmospheric pressure.

While the slurry in the autoclave was being stirred at 120 rpm under a temperature of 75° C. and a pressure of 290 mmHg abs., vinyl chloride monomer was recovered in the same way as in Example 1. The slurry samples thus obtained were analyzed in the same way for the amount of vinyl chloride monomer contained in the samples. The results are shown in Table 2, in which each amount is given as calculated in terms of the amount of vinyl chloride monomer per unit weight of the polyvinyl chloride contained in the slurry sample.

TABLE 2

| Recovery time (min.) | Number of average circulation times of slurry | Vinyl chloride monomer conc. in polyvinyl chloride (ppm) | |
|---|---|---|---|
| | | Invention | Blank |
| 0 | 0 | 12,100 | 14,100 |
| 10 | 10 | 1,050 | 9,780 |
| 20 | 20 | 162 | 7,830 |
| 30 | 30 | 59 | 6,020 |
| 45 | 45 | 12 | 5,000 |
| 60 | 60 | 9 | 3,550 |

As apparent from Table 2, it is understood that, to attain a vinyl chloride monomer concentration in the obtained polyvinyl chloride of less that 200 ppm, a treating time of 20 minutes is sufficient, and for a concentration of less than 10 ppm, 60 minutes is sufficient.

EXAMPLE 3

A polymerized slurry was obtained in the same way as in Example 1. Then unreacted vinyl chloride monomer remaining in the autoclave, about 2 liters in capacity, used for polymerization, was released until the pressure in the autoclave reached atmospheric pressure.

Then, while the slurry in the autoclave was being stirred at 120 rpm under a temperature of 65° C. and a pressure of 190 mmHg abs., vinyl chloride monomer was recovered in the same way as in Example 1. The slurry samples thus obtained were analyzed in the same way for the amount of vinyl chloride monomer contained in the slurry sample. The results are shown in Table 3, in which each amount is given as calculated in terms of the amount of vinyl chloride monomer per unit weight of the polyvinyl chloride contained in the slurry sample.

TABLE 3

| Recovery time (min.) | Number of average circulation times of slurry | Vinyl chloride monomer conc. in polyvinyl chloride (ppm) | |
|---|---|---|---|
| | | Invention | Blank |
| 0 | 0 | 11,700 | 12,300 |
| 10 | 10 | 2,300 | 10,900 |
| 20 | 20 | 1,250 | 9,200 |
| 30 | 30 | 420 | 7,400 |
| 45 | 45 | 210 | 7,100 |
| 60 | 60 | 135 | 6,600 |

EXAMPLE 4

A polymerized slurry was obtained in the same way as in Example 1. Then, unreacted vinyl chloride monomer remaining in the autoclave, about 2 liters in capacity, used for polymerization, was released until the pressure in the autoclave reached atmospheric pressure.

Thereafter, the slurry in the autoclave, under stirring at 120 rpm, a temperature of 65° C. and a pressure of 190 mmHg abs., was continuously withdrawn at the rate of 3 liters per minute from the bottom of the autoclave, and vinyl chloride monomer was recovered in the same way as in Example 1, to obtain slurry samples which were analyzed in the same way. The results are shown in Table 4, in which each amount of vinyl chloride monomer is given as calculated in terms of the amount per unit weight of the polyvinyl chloride contained in the corresponding slurry sample.

TABLE 4

| Recovery time (min.) | Number of average circulation times of slurry | Vinyl chloride monomer conc. in polyvinyl chloride (ppm) | |
|---|---|---|---|
| | | Invention | Blank |
| 0 | 0 | 14,100 | 13,200 |
| 10 | 20 | 1,534 | 11,200 |
| 20 | 40 | 275 | 9,430 |
| 30 | 60 | 142 | 7,300 |

As apparent from Table 4, by doubling the number of average circulation times of slurry per unit time of Example 3, the desired concentration of vinyl chloride monomer remaining in the obtained polyvinyl chloride can be attained in about half of the time in Example 3.

EXAMPLE 5

In each of five autoclaves having about 2 liters capacity, a polymerized slurry was obtained in the same way as in Example 1. Then, unreacted vinyl chloride monomer remaining in each autoclave used for polymerization was released until the pressure in the autoclave reached atmospheric pressure.

Thereafter, the temperature of the slurry in each autoclave was set at 75° C., and the pressure in each autoclave was set at 290, 314, 355, 430 and 500 mmHg abs., respectively, to see how the pressure in the autoclave exerts influence on the recovery of vinyl chloride monomer in the slurry. While each slurry was being stirred at 120 rpm, vinyl chloride monomer was recovered as in Example 1. The thus obtained slurry samples were analyzed in the same way to obtain the amount of vinyl chloride monomer in the slurry. This amount was calculated in terms of the amount per unit weight of the polyvinyl chloride contained in the slurry sample. The results, which were obtained after 60 minutes of recovery treatment, are shown in Table 5.

TABLE 5

| Sample No. | Pressure in autoclave (mmHg abs.) | Vinyl chloride monomer conc. in polyvinyl chloride (ppm) |
|---|---|---|
| 1 | 290 | 8 |
| 2 | 314 | 37 |
| 3 | 355 | 260 |
| 4 | 430 | 660 |
| 5 | 500 | 1,480 |

As apparent from Table 5, when the pressure in the autoclave is set at a pressure below 433.6 mmHg abs. (which is the vapor pressure of water at 85° C., which temperature is 10° C. higher than the temperature of the slurry), the effect of the present invention is clearly manifested, and when the pressure is set at a pressure below 314 mmHg abs. (which is the vapor pressure of water at 77° C., which temperature is 2° C. higher than the temperature of the slurry), the effect is markedly manifested.

EXAMPLE 6

A polymerized slurry was obtained in the same way as in Example 1. Then, unreacted vinyl chloride monomer remaining in the autoclave, about 2 liters in capacity, used for polymerization, was released until the pressure in the autoclave reached atmospheric pressure.

Thereafter, the slurry in the autoclave was continuously withdrawn from the bottom of the autoclave at the rate of 1.5 liters per minute under stirring at 120 rpm, with the temperature of the slurry and the pressure in the autoclave maintained at 85° C. and 435 mmHg abs., respectively. The withdrawn slurry was jetted into the gas phase portion of the autoclave in the form of fine streams from 10 nozzles, each about 1 mm in radius. Vinyl chloride monomer was thus recovered for 60 minutes, while a part of the slurry was successively sampled to see how the concentration of vinyl chloride monomer was reduced. Each of the thus obtained slurry samples was analyzed in the same way as in Example 1 for the amount of vinyl chloride monomer contained in the slurry sample. The results are shown in Table 6, in which the amount is given as calculated in terms of the amount per unit weight of the polyvinyl chloride contained in the slurry sample. The blank in Table 6 is the blank in Example 1.

TABLE 6

| Recovery time (min.) | Number of average circulation times of slurry | Vinyl chloride monomer conc. in polyvinyl chloride (ppm) | |
|---|---|---|---|
| | | Invention | blank |
| 0 | 0 | 12,300 | 12,140 |
| 10 | 10 | 283 | 8,030 |
| 20 | 20 | 41 | 5,510 |
| 30 | 30 | 16 | 2,000 |
| 45 | 45 | 5 | 1,430 |
| 60 | 60 | <1 | 1,020 |

EXAMPLE 7

In the same way as in Example 1, a polymerized slurry was obtained. Then, unreacted vinyl chloride monomer remaining in the autoclave, about 2 liters in capacity, used for polymerization, was released until the pressure in the autoclave reached atmospheric pressure.

Thereafter, the slurry in the autoclave was continuously withdrawn by a pump from the bottom of the autoclave at the rate of 1.5 liters per minute, under stirring at 120 rpm, with the temperature of the slurry in the autoclave maintained at 85° C. and the pressure in the autoclave at 435 mmHg abs. The withdrawn slurry was flowed down on the wall of the gas phase portion of the autoclave in the form of a thin layer of about 1 mm in thickness through 10 nozzles, each about 1 mm in radius. Vinyl chloride monomer was thus recovered for 60 minutes, while a part of the slurry was sampled in succession to see how the concentration of vinyl chloride monomer in the slurry was reduced. Each of the thus obtained slurry samples was analyzed in the same way to obtain the amount of vinyl chloride monomer contained in the slurry sample. The results are set forth in Table 7, in which the amount is given as calculated in terms of the amount per unit weight of the polyvinyl chloride contained in the slurry sample.

TABLE 7

| Recovery time (min.) | Number of average circulation times slurry | Vinyl chloride monomer conc. in polyvinyl chloride (ppm) | |
|---|---|---|---|
| | | Invention | Blank |
| 0 | 0 | 13,100 | 12,140 |
| 10 | 10 | 198 | 8,030 |
| 20 | 20 | 31 | 5,510 |
| 30 | 30 | 12 | 2,000 |
| 45 | 45 | 5 | 1,430 |
| 60 | 60 | <1 | 1,020 |

What is claimed is:

1. In a process for reducing the concentration of vinyl chloride monomer in a polymerized slurry obtained by the suspension-polymerization, in an aqueous medium, of vinyl chloride alone or a mixture of vinyl chloride with a monomer copolymerizable therewith, the improvement wherein the polymerized slurry, at a temperature between 40° C. and 100° C., is jetted into a gas phase portion of a vessel maintained at a pressure of higher than 55.4 mmHg abs. and lower than atmospheric pressure while circulating the polymerized slurry through the gas phase portion of the vessel until the concentration of vinyl chloride monomer in the polymerized slurry is reduced to less than 500 ppm.

2. The process as claimed in claim 1 wherein the vessel is equipped with one or more baffle boards to increase the contact time and contact area of the polymerized slurry with the gas phase portion.

3. The process as claimed in claim 1 wherein the temperature of the slurry is between 50° C. and 90° C.

4. The process as claimed in claim 1 wherein, upon jetting the slurry into the gas phase portion, the pressure in the gas phase portion is reduced to a pressure which is higher than 92.5 mmHg abs. and lower than atmospheric pressure.

5. The process as claimed in claim 1, wherein the polymer in the slurry is a copolymer of vinyl chloride with up to 30% by weight of a monomer copolymerizable therewith.

6. The process as claimed in claim 1 wherein the polymerized slurry is withdrawn from the polymerization vessel and the polymerized slurry is then jetted into the gas phase portion of the polymerization vessel or the gas phase portion of another vessel.

7. The process as claimed in claim 6 wherein the slurry is jetted into the gas phase portion in the form of fine droplets.

8. The process as claimed in claim 6 wherein the slurry is jetted into the gas phase portion in the form of fine streams.

9. The process as claimed in claim 6 wherein the slurry is jetted in the form of fine droplets through the gas phase portion against the vessel wall in contact with the gas phase portion and is then permitted to flow down on the wall.

10. The process as claimed in claim 6 wherein the slurry is jetted in the form of fine streams through the gas phase portion against the vessel wall in contact with the gas phase portion and is then permitted to flow down on the wall.

11. The process as claimed in claim 1 wherein the vinyl chloride monomer concentration in the polymer is reduced to a concentration less than 10 ppm.

12. The process as claimed in claim 1 wherein the vinyl chloride monomer concentration in the polymer is reduced to a concentration less than 1 ppm.

13. The process as claimed in claim 1 wherein the monomer copolymerizable with vinyl chloride is at least one of vinyl acetate, ethylene, propylene and vinyl ether.

* * * * *